United States Patent [19]
Hart et al.

[11] Patent Number: 4,819,909
[45] Date of Patent: Apr. 11, 1989

[54] SELF-CLOSING VALVE FOR SANITARY INSTALLATIONS

[75] Inventors: Thomas G. Hart, Piscataway; Karl G. Ohaus, Chatham; Earl W. Nickerson, Ocean City; David J. Meisner, Monmouth Beach, all of N.J.

[73] Assignee: American Standard Inc., New York, N.Y.

[21] Appl. No.: 225,437

[22] Filed: Jul. 28, 1988

[51] Int. Cl.[4] .................. F16K 21/06; F16K 31/122
[52] U.S. Cl. .................................................. 251/48
[58] Field of Search ................ 251/23, 36, 42, 47, 251/48, 50, 51, 52, 53, 54, 55

[56] References Cited

U.S. PATENT DOCUMENTS

| | | | |
|---|---|---|---|
| 38,048 | 5/1863 | Bartholomew | 251/23 |
| 111,518 | 2/1871 | Dalziel | |
| 177,095 | 5/1876 | Clark | |
| 244,882 | 7/1881 | Furney | |
| 266,484 | 10/1882 | Lanston | |
| 402,475 | 4/1889 | Furney | |
| 531,484 | 12/1894 | Turner | 251/48 |
| 557,292 | 3/1896 | Turner | 251/48 |
| 599,158 | 2/1898 | Andriveau | |
| 621,388 | 3/1899 | Turnbull | 251/23 |
| 621,549 | 3/1899 | Watson | 251/55 |
| 640,497 | 1/1900 | Staples | |
| 674,844 | 5/1901 | Kupsch | |
| 713,788 | 11/1902 | Nethery | |
| 753,964 | 3/1904 | Douenne | |
| 907,951 | 12/1908 | Barr | |
| 964,735 | 7/1910 | Ashley | 251/23 |
| 1,184,563 | 5/1916 | Odet | |
| 1,274,195 | 7/1918 | Purnell | 251/23 |
| 1,298,849 | 4/1919 | Wolff | 251/54 |
| 1,513,830 | 11/1924 | La Casse | 251/55 |
| 1,537,440 | 5/1925 | Gymnaitis | 251/55 |
| 1,660,352 | 2/1928 | Payne | 251/15 |
| 1,768,305 | 6/1930 | Bentley | |
| 1,812,301 | 6/1931 | Nasmyth | 251/23 |
| 1,857,363 | 5/1932 | Dencklau | 251/55 |
| 1,959,955 | 5/1934 | Hedges | 251/22 |
| 2,781,519 | 2/1957 | Marchant | 4/31 |
| 2,815,042 | 12/1975 | Passaggio | 137/620 |
| 2,991,795 | 7/1961 | Fraser et al. | 251/52 |
| 3,065,948 | 11/1962 | Nolan | 251/52 |
| 3,197,172 | 7/1965 | Brandenberg et al. | 251/23 |
| 3,342,448 | 9/1967 | Parkinson | 251/51 |
| 3,376,013 | 4/1968 | Mallett | 251/55 |
| 3,712,577 | 1/1973 | Loveless | 251/23 |
| 3,804,295 | 4/1974 | Humper et al. | 222/20 |
| 3,918,676 | 11/1975 | Carson | 251/51 |
| 4,261,545 | 4/1981 | Allen | 251/40 |
| 4,457,452 | 7/1984 | Symmons | 222/20 |
| 4,471,937 | 9/1984 | Scragg | 251/23 |
| 4,662,602 | 5/1987 | Johnson | 251/44 |

FOREIGN PATENT DOCUMENTS

| | | |
|---|---|---|
| 1127723 | 4/1962 | Fed. Rep. of Germany |
| 2200671 | 7/1972 | Fed. Rep. of Germany |
| 2908882 | 9/1980 | Fed. Rep. of Germany |

*Primary Examiner*—George L. Walton
*Attorney, Agent, or Firm*—James J. Salerno, Jr.; Robert G. Crooks; John P. Sinnott

[57] ABSTRACT

A self-closing valve, having means to discharge a predetermined volume of water for each cycle of operation, is disclosed. The valve includes the arrangement of timing means which determines the elapsed time for its operational cycle, a one-way valve means to expel air from the metering chamber during the actuating cycle of the valve, and air metering means which replaces air entering the mixing chamber at a constant uniform rate, all of which cooperate with the valving means to discharge a predetermined volume of water.

38 Claims, 12 Drawing Sheets

TIMING FLUID

METERIZED FLUID

SELF-CLOSING VALVE FOR SANITARY INSTALLATIONS

BACKGROUND OF THE DISCLOSURE

1. FIELD OF THE INVENTION

The invention relates to a self-closing valve for sanitary installations and, more particularly, to an improved self-closing valve assembly which will automatically close after a predetermined time has elapsed.

2. DESCRIPTION OF PRIOR ART

Self-closing faucets of the type having a reciprocating handle, and when actuated the valve is opened, and when released the valve returns to its closed position.

One of the advantages of self-closing faucets is that the quantity of water released upon actuation can be proportioned by a one-time adjustment when the assembly is installed so that water conservation is optimized. Self-closing faucets are used primarily in public installations, such as baths, toilets, sanitary facilities in institutional buildings, railroad stations, airports and the like. It is in the interest of water economy and conservation of water use to provide a self-closing valve to pre-select the quantity of water to be discharged. Other types of self-closing valves are universally known, such as push-button or lever-actuated fittings for drinking fountains, eye wash fountains, flushing toilets, urinals or the like.

Self-closing faucets employ a metering fluid, such as water or oil, that is displaced when the valve is opened and then, through a timing means, the displaced fluid refills the metering chamber after an elapse of a predetermined period of time.

Self-closing valves which use water as metering fluid encounter various disadvantages, such as: clogging due to particles normally entrained in water, corrosion of valve parts due to agressive water, washout of lubricants used in the moving valve parts, variation in supply pressures and temperatures, and degradation of elastomer components, both natural and synthetic. In addition, self-closing valves, which use alternate metering fluids such as oil, require a separate storage reservoir to transfer the oil from the metering chamber to the reservoir and return it to the metering chamber to complete the cycle. Any rupture or failure in the system could lead to contamination of the potable water being delivered by the metering faucet.

SUMMARY OF THE INVENTION

An object of the present invention is to provide a self-closing valve having an accurate metering assembly to regulate the volume of water discharged over a predetermined period of elapsed time, which is simple and economical to manufacture, which includes means to readily vary the metering time and thereby vary the volume of water discharged, and which is interchangeable with standardized fittings that are in present use.

Another object of the invention is to provide an air metering assembly which includes anti-clogging means so that the discharged volume of water from the self-closing valve remains substantially the same after each use.

The invention generally contemplates a self-closing valve having a valve body which defines a water passageway, an inlet, an outlet and a valving means. The valving means includes a reciprocating valve stem axially mounted in the valve body, a stationary valve seat positioned between the inlet and outlet openings, and an axially displaceable valve seat mounted on the valve stem so that when the valve stem is shifted from its closed to its opened position, the displaceable valve seat is shifted away from the stationary valve seat. An air metering means is operably coupled to the valve stem. The air metering means includes a piston shiftably mounted in the valve body, and cooperates with the reciprocating valve stem to define an air chamber therein. A one-way valve means is mounted on the valve body and is operably coupled to the air chamber so that air is expelled through the one-way valve means when the piston is shifted inwardly, at the same time, the movable valve seat is shifted away from the fixed valve seat, allowing water flow through the discharge passageway. In addition, a timing means is coupled to the air metering means so that the volume of air displaced from the air chamber is metered over a predetermined elapsed period of time as the piston and reciprocating valve stem automatically return to their closed position.

Another function of the invention provides an air metering assembly, which includes at least one air intake passageway formed in the valve body, and communicates with the air chamber. An orifice is interposed in the intake passageway to meter intake air to refill the air chamber. At least one air filter is positioned in the intake air passageway to remove particles which would tend to clog or otherwise cause a malfunction of the air metering means.

DESCRIPTION OF THE PREFERRED EMBODIMENT

Figure 10:
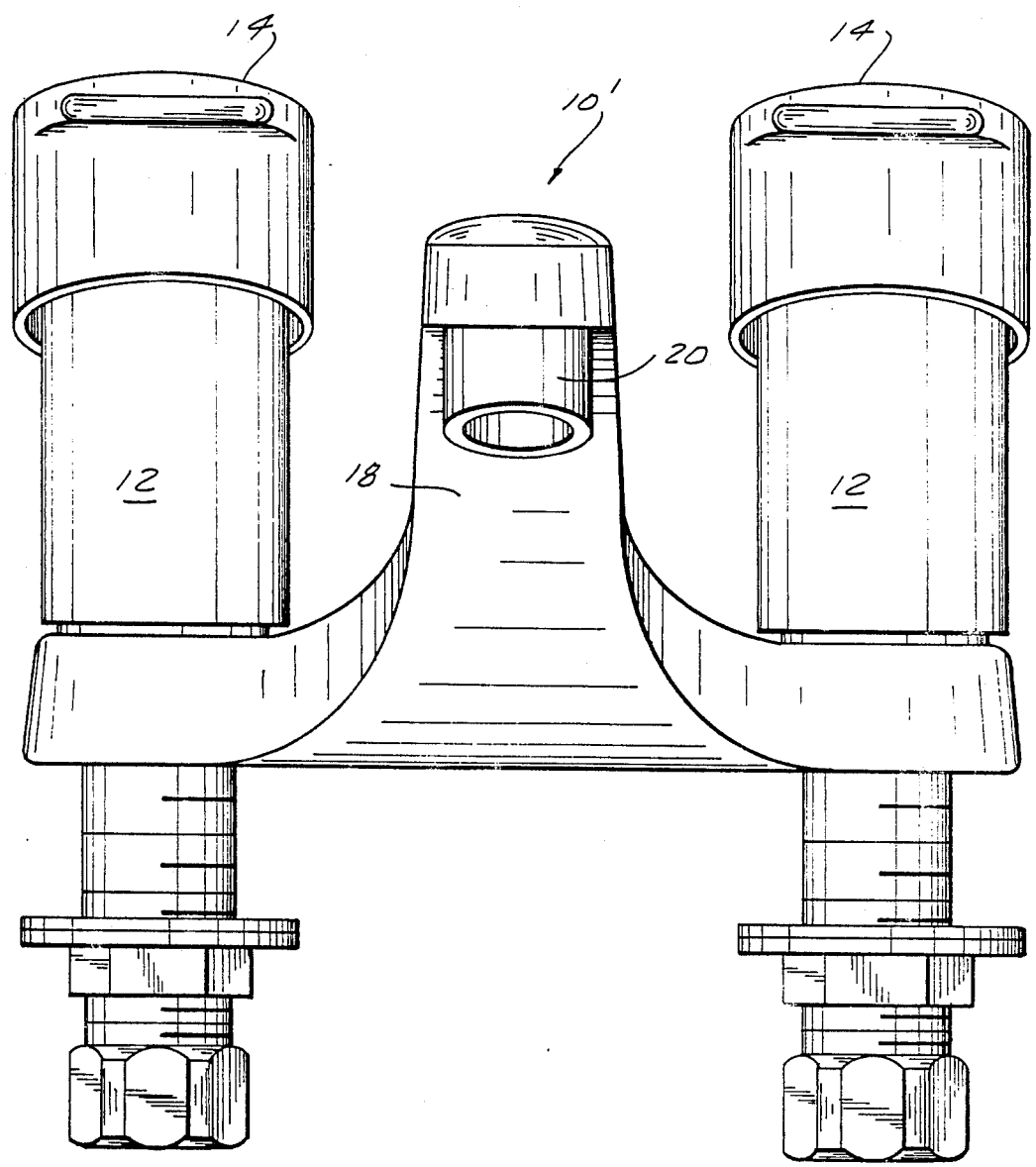
FIG. 10 is a front elevational view of a lavatory center set mixing valve, having hot and cold water mixing valves, shown in FIG. 1.
Figure 11:
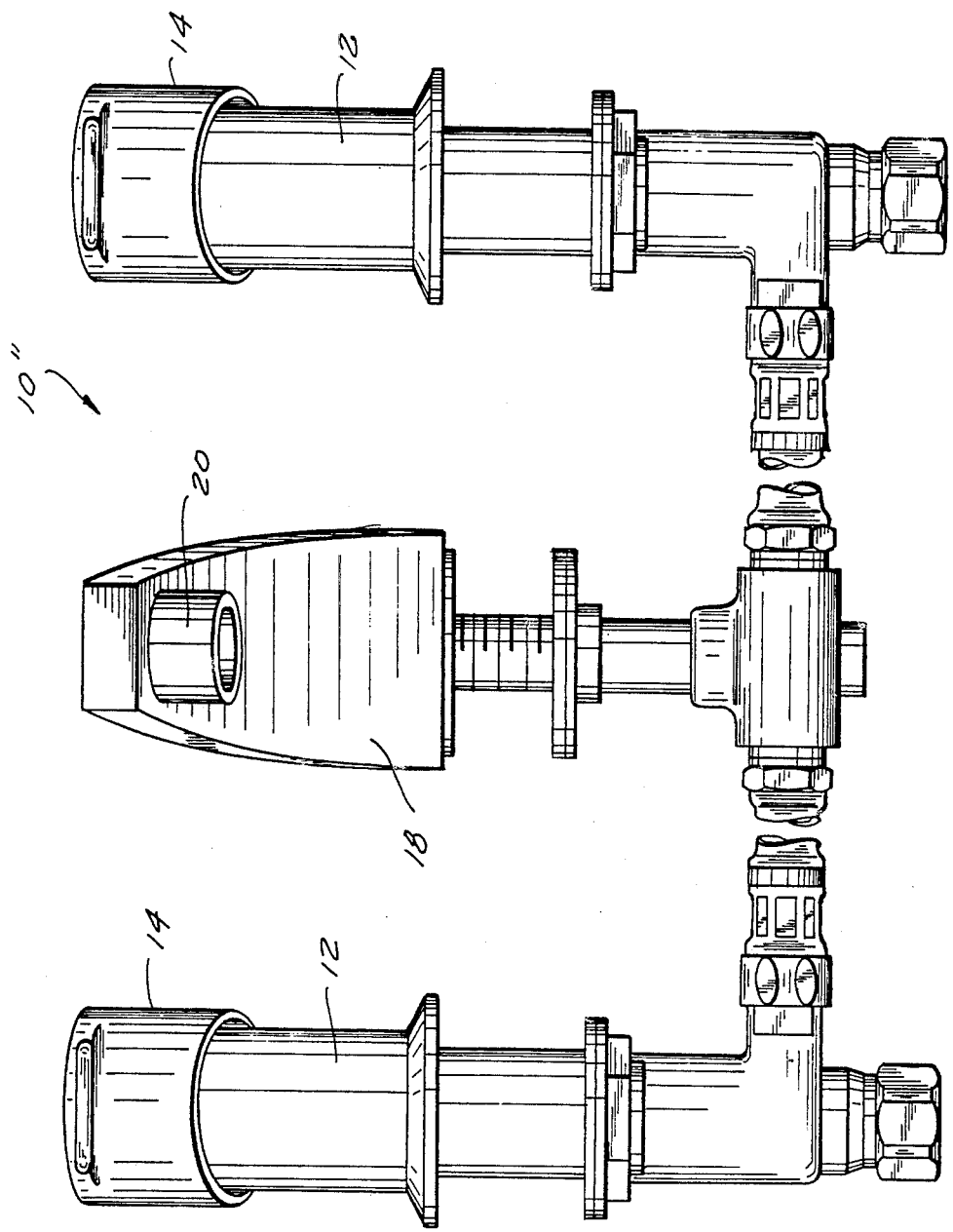
FIG. 11 is a front elevational view of a lavatory mixing valve of the spread type, having hot and cold water self-closing valves, shown in FIG. 1.

Referring to the drawings, FIGS. 1-9 show one form of the invention, a faucet 10 having a self-closing assembly 12 for either hot or cold water, and FIGS. 10 and 11 show lavatory mixing valves of the center set and spread set types, 10',10" respectively, which house self-closing valve assemblies 12, of the type shown in FIGS. 4-9, to control both hot and cold water use.

Figure 1:
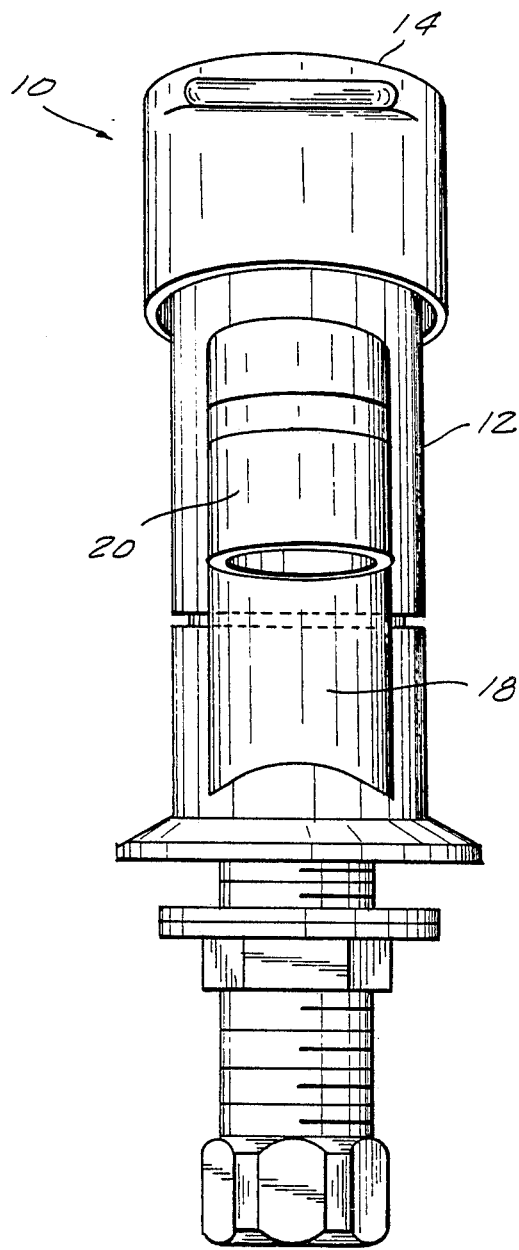
FIG. 1 is a front elevational view of a self-closing faucet, in accordance with the invention herein.
Figure 2:
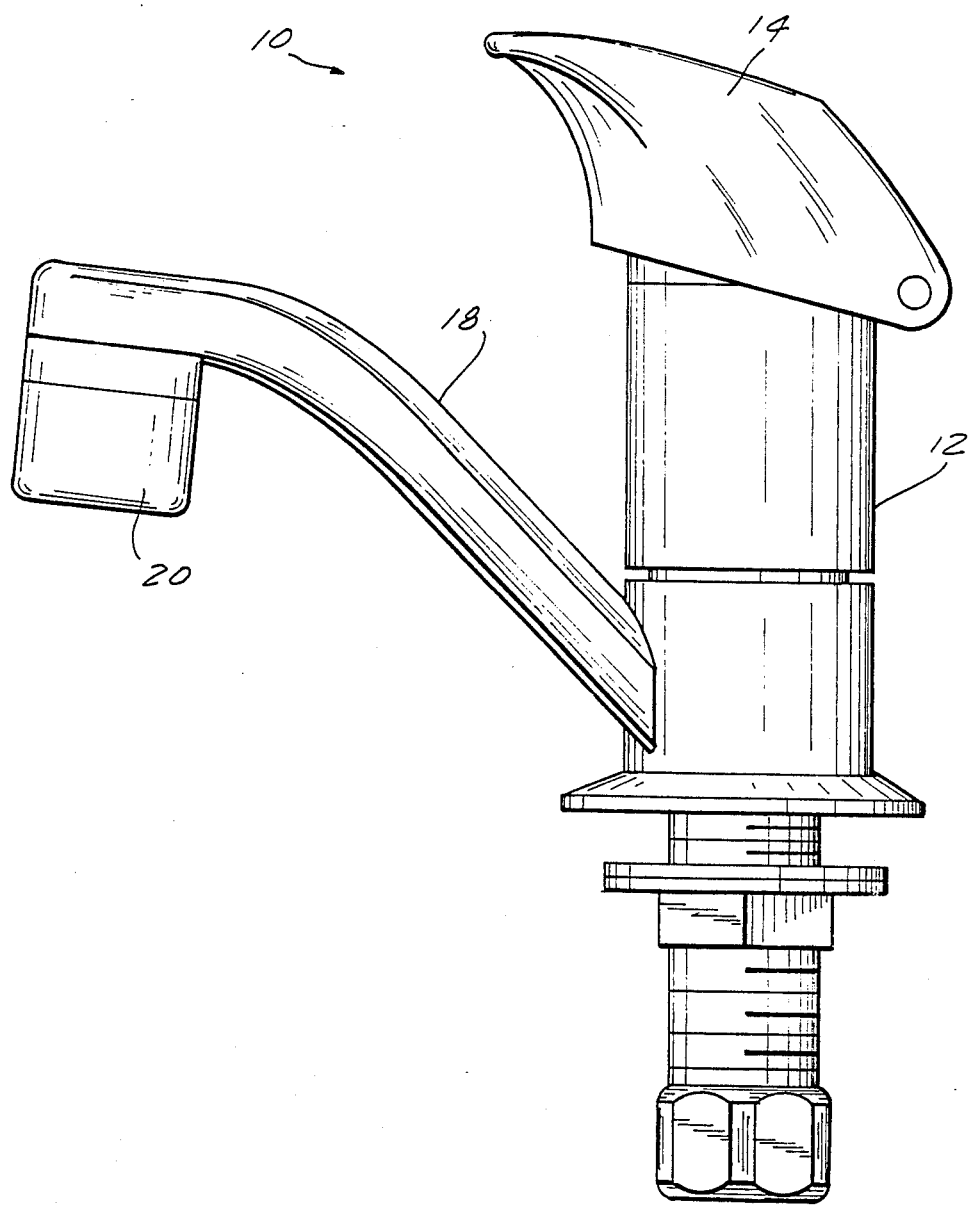
FIG. 2 is a side elevational view of FIG. 1 as seen from the right side, the left side being a mirror image thereof.
Figure 3:
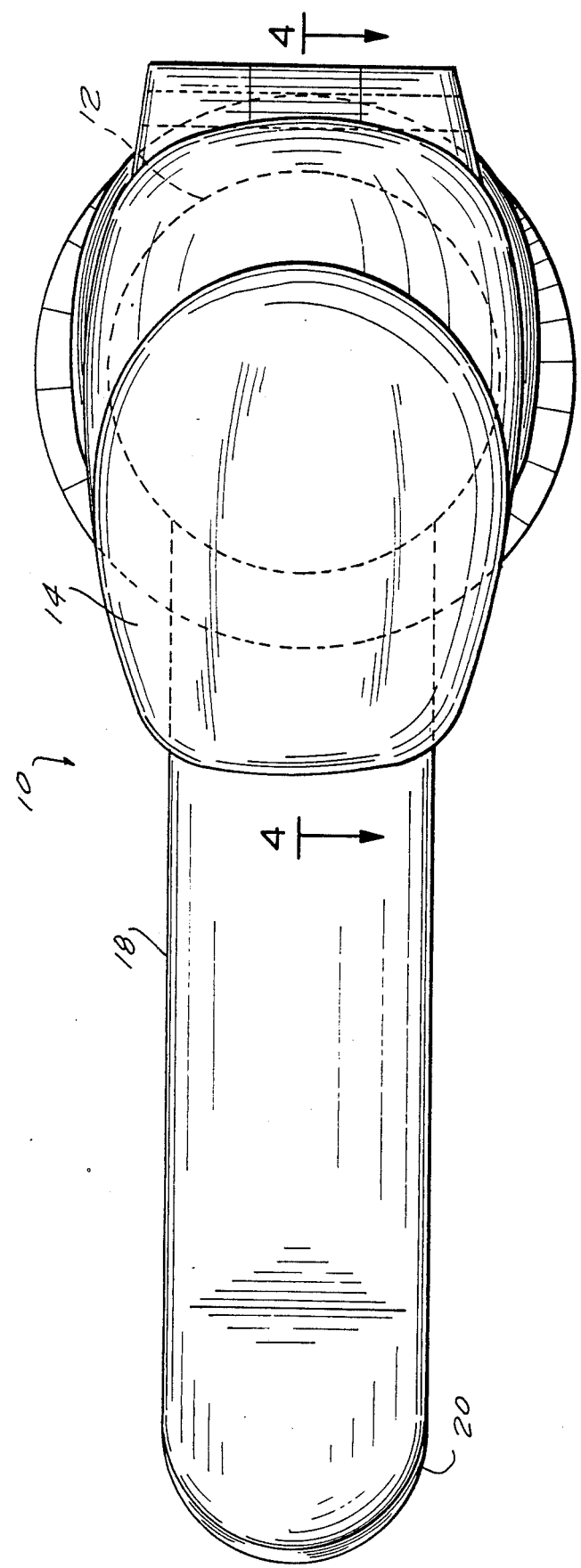
FIG. 3 is a top plan view of FIG. 1.

FIGS. 1-3 illustrate a self-closing faucet 10 which is adapted to be connected to either the hot or cold water feed conduits, not shown. Faucet 10 includes a handle 14, self-closing valve assembly 12, shown in detail in FIGS. 4–9, spout 18, and an aerator assembly 20.

Figure 4:
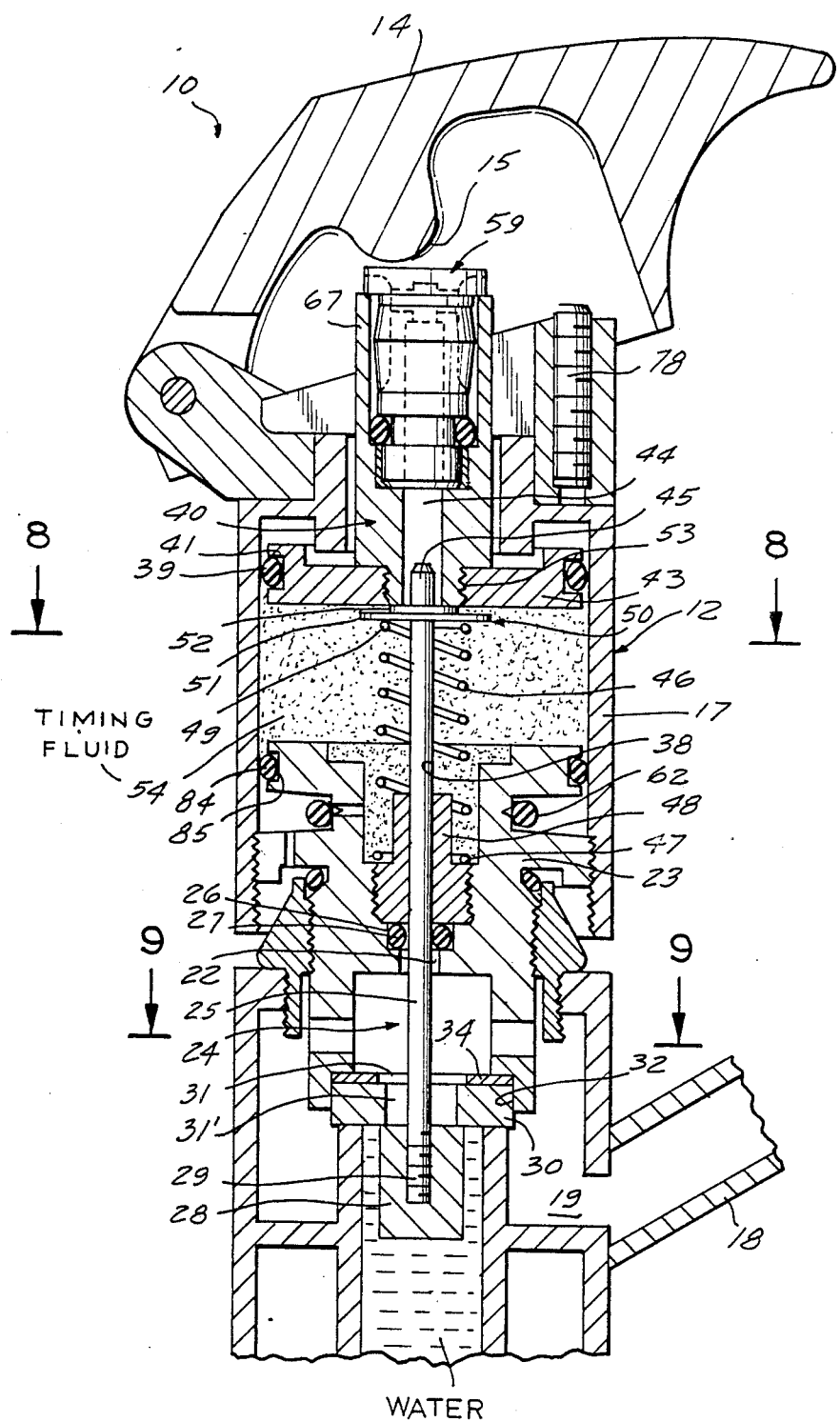
FIG. 4 is a sectional view, in elevation, taken along line 4—4 of FIG. 3, illustrating the self-closing faucet of FIG. 1 in its closed position.
Figure 6:
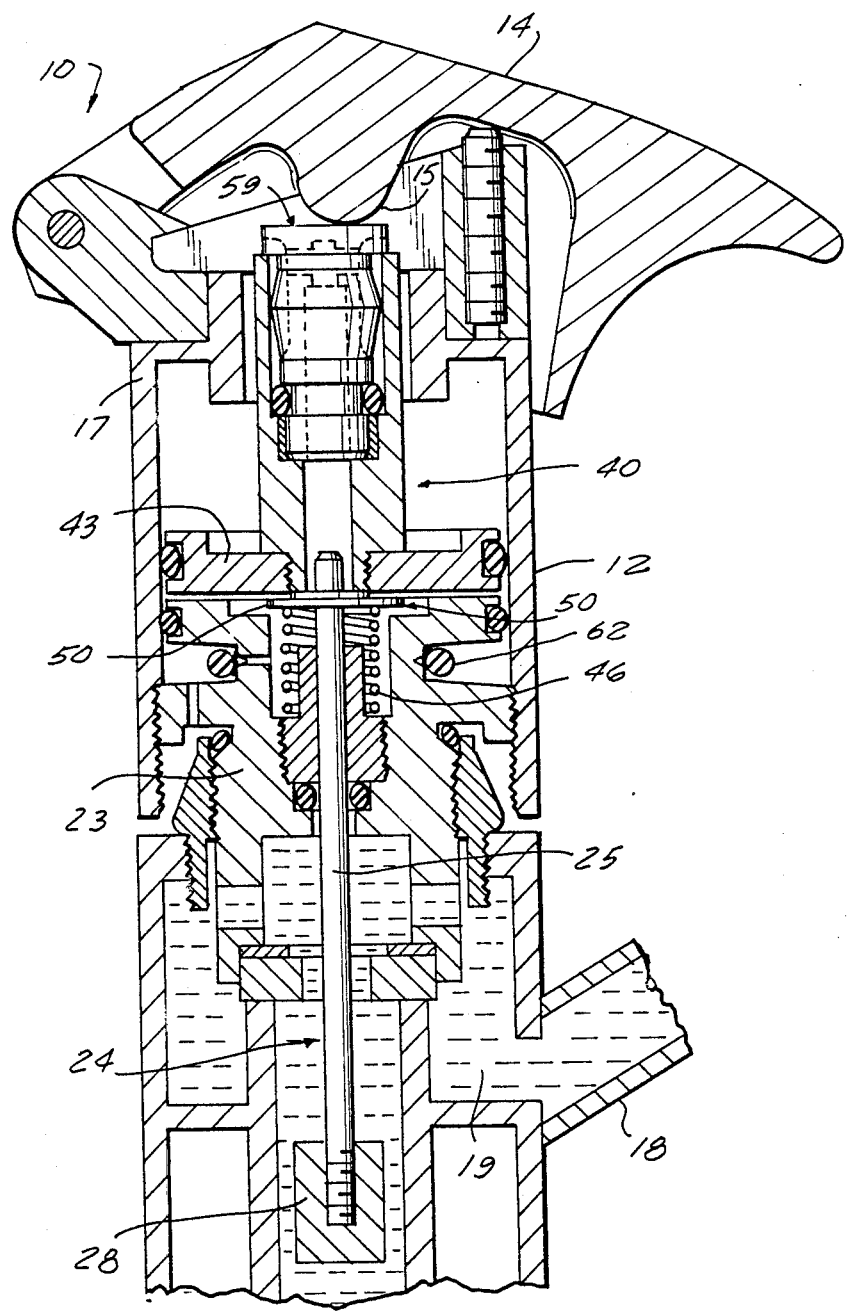

Self-closing valve assembly 12 includes upper housing 17 which has operably mounted therein, timing assembly 40 and lower housing 23 which has valve means 24 axially mounted therein and reciprocates between closed position, FIG. 4, and opened position, FIG. 6. O-ring 84, located in groove 85 of lower housing 23, forms an airtight seal between upper housing 17 and lower housing 23. Valve means 24 includes an elongated stem 25 which is positioned in axial bores 22,38 and boss 48 of lower housing 23. O-ring 27 is positioned in bore 26, and forms a seal to prevent water passing into air metering chamber 54. Cap 28, the displaceable valve seat, is mounted to lower end 29 of valve stem 25. Elastomeric member 30, a flat resilient washer, and metal washer 34 are mounted in recess 32 of lower housing 23. Stem 25 passes through axial bore 31',31 of resilient washer 30 and metal washer 34 respectively. When self-closing valve assembly 12 is in its closed position, cap 28 seats against resilient washer 30 to prevent water flow through water discharge passage 19 and spout 18, shown in FIG. 4.

Upper end 45 of valve stem 25 enters into axial passage 44 of timing assembly 40. Spring 46 is telescopically positioned on valve stem 25; its lower end 47 is seated over boss 28 which is threaded into lower housing 23. Spring keeper assembly 50 includes a washer 51 which seats against upper end 49 of spring 46 and is held in place by retaining clip 51, which is locked in place on valve stem 25 by a complimentary groove formed around end 45 of valve stem 25.

Figure 7A:
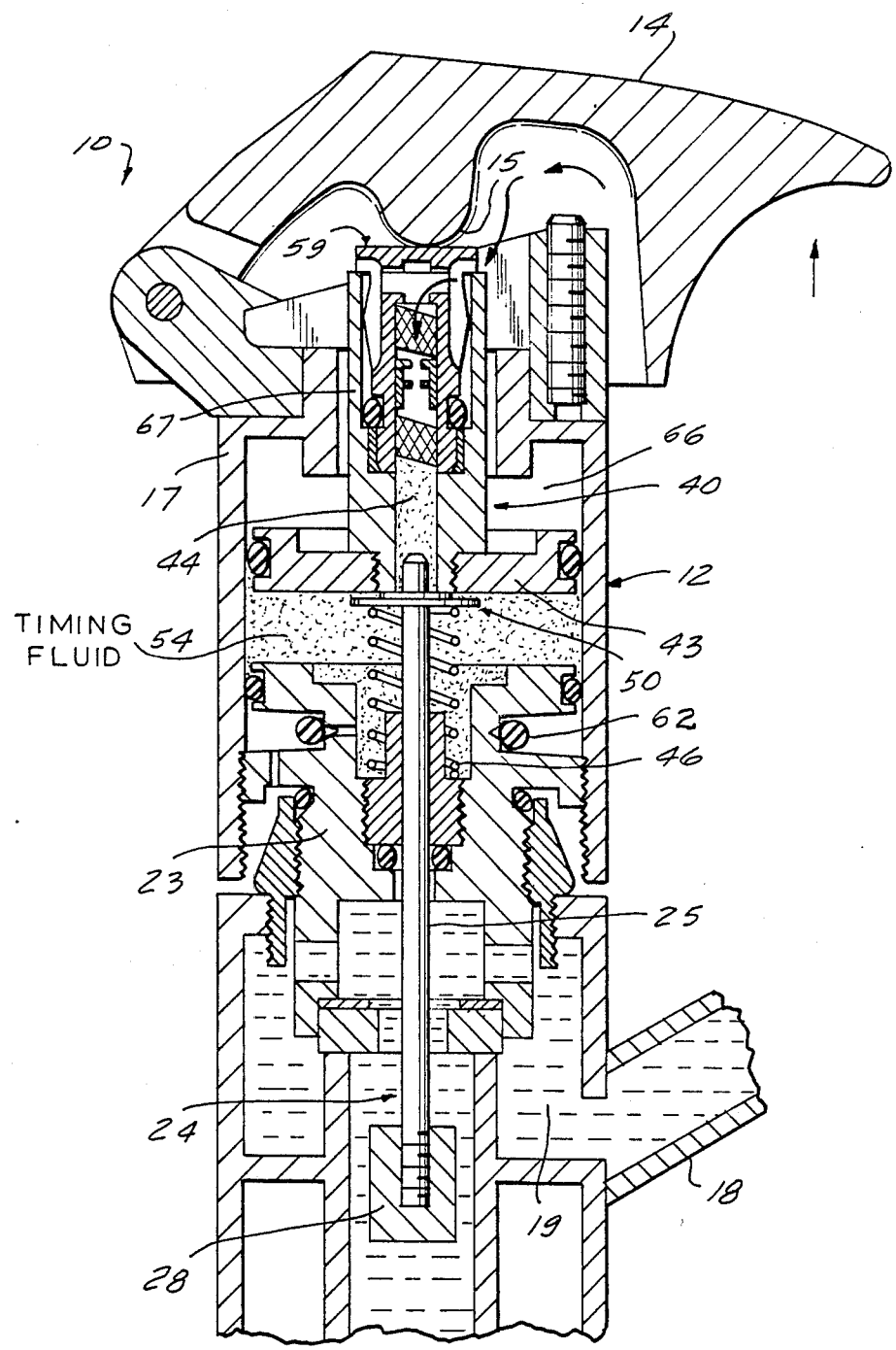
Figure 7B:
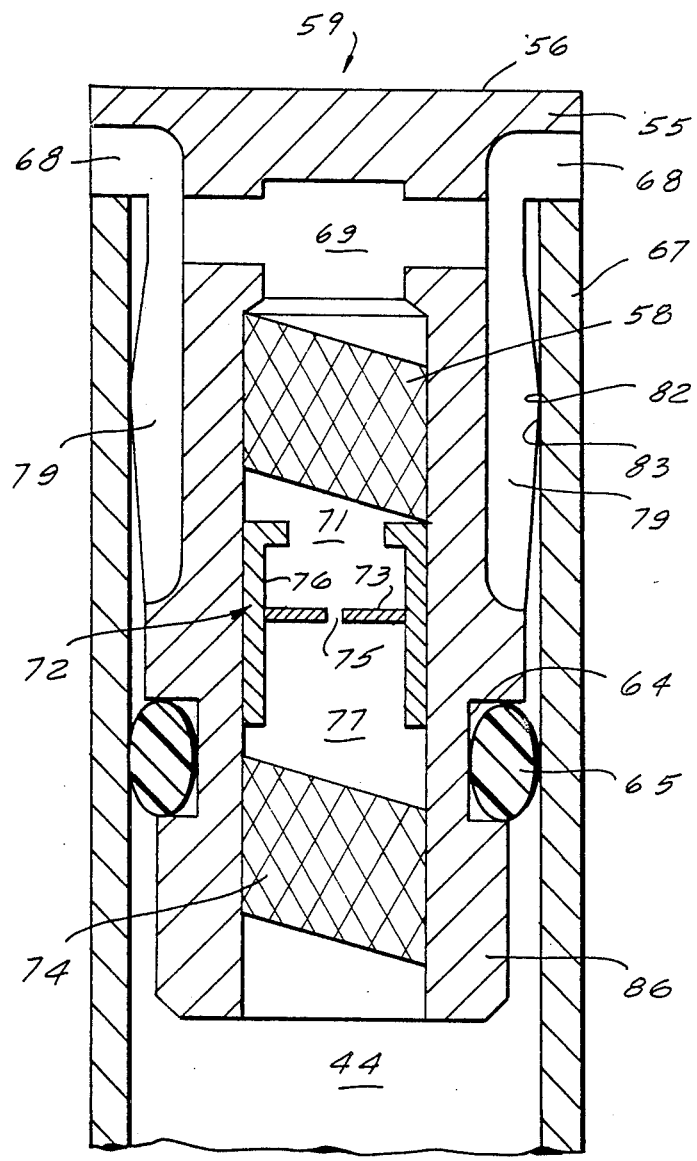
FIG. 7B is an enlarged fragmentary view of the anti-clogging assembly of the air metering means.
Figure 8:
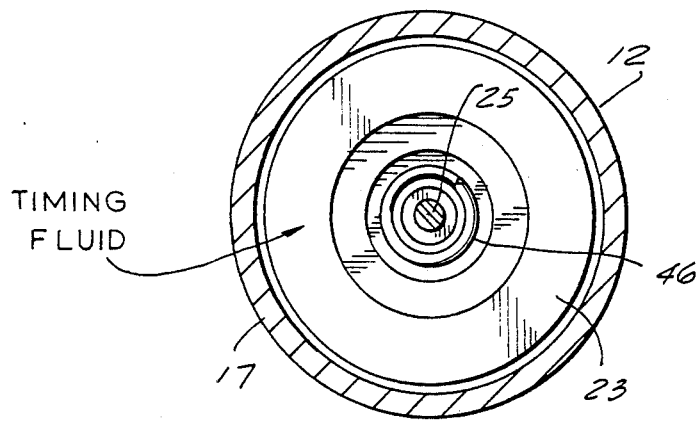
FIGS. 8 and 9 are sectional views taken along lines 8—8 and 9—9 of FIG. 4 respectively.
Figure 9:
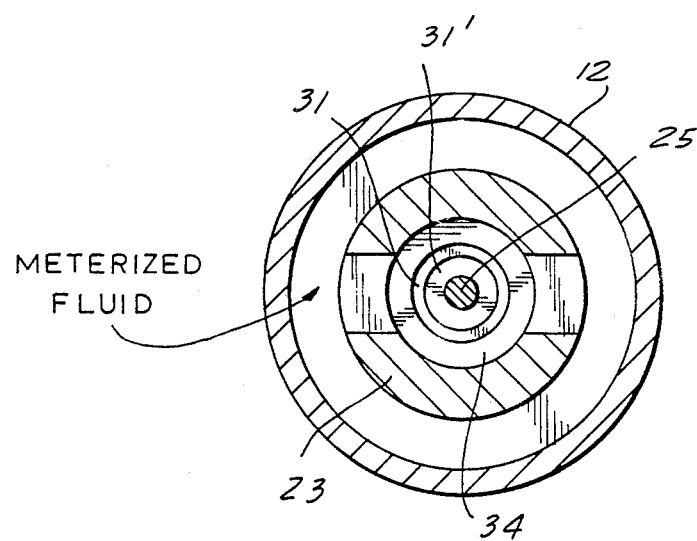

Timing assembly 40, shown in detail in FIG. 7B, includes air filter assembly 59, a cylindrical cartridge, having an enlarged radially extending outer wall section 82 on its periphery which fits into a complimentary recess 83 of hollow, cylindrical member 67. Member 67 is threadedly coupled in complimentary threaded opening 53 of disc 43. Circumferential groove 41 formed in disc 43 contains O-ring 39, which forms an airtight seal between disc 43 and upper housing 17. Filter assembly 59, preferably a molded plastic material, is in the form of a hollow tube 86; its upper end 55 is closed to provide a flat outer surface which forms camming surface 56. Ports 68, positioned adjacent to camming surface 56, are provided to permit atmospheric air to enter into chamber 69 of filter assembly 59. A first air filter 58, which may be in the form of a porous plastic material, is pressed into air chamber 69. Orifice assembly 72 includes a tube or sleeve 76 and a jeweled member 73, i.e. a ruby, which is mounted at one end thereof. Jeweled member 73 is formed having orifice 75 which permits a predetermined volume of air to flow therethrough for a predetermined period of time. It has been found that for the type of self-closing faucet described and shown herein, orifice 75 is sized to permit a flow rate of about 0.6 cc of air per second. Metering chamber 54 of valve 12 has an air volume of about 8.5 cc. Therefore, a complete operational cycle of faucet 10 is about 14 seconds. Also, air filters 58, 74 have a pore size smaller than the diameter of orifice 75 to prevent its clogging from entrained particles carried by the intake air. The operational cycle may be reduced by raising adjusting screw 78, shown in FIG. 4, which limits the volume of air displaced from chamber 54 when handle 14 is depressed, thus shortening the operational cycle.

A second air filter 74 is pressed into chamber 69 of filter cartridge 59 to prevent any foreign matter, such as valve lubricants, expelled from metering chamber 54 from entering orifice 75. Extending from ports 68 are vertical channels 79 which form a cavity between filter assembly 59 and the inner wall of cylindrical member 67. These cavities act as receptacles for entrained particles that are removed from the air before entering chamber 69. An annular recess 64 is formed on filter assembly 59 below elongated channels 79 and houses O-ring 65 to provide an airtight seal.

Figure 4A:
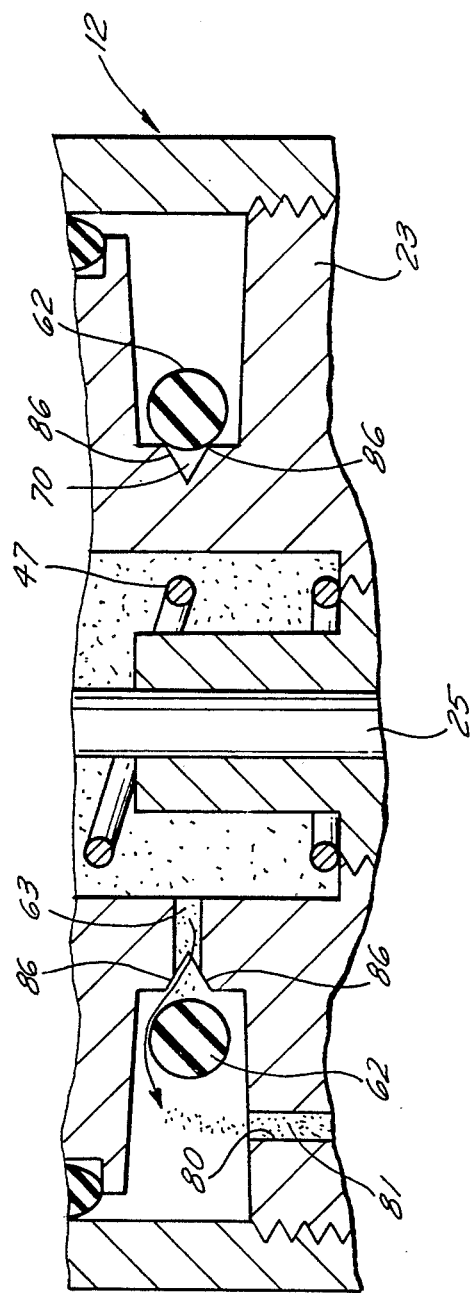
FIG. 4A is an enlarged sectional view, in elevation, of the one-way valve means of FIG. 4.

On-way valve means 60 is most clearly illustrated in FIG. 4A. Lower housing 23 is formed having a circumferential groove 61 which is connected to metering chamber 54 through one or more passages 63. An O-ring 62 is seated in groove 61 and covers the outlet opening 70 of passages 63. The width of groove 61 is larger than the diameter of O-ring 62. To insure a positive seal of passage openings 70, a "V"-shaped recess 86' is formed in both the base of groove 61 and outlet openings 70 of passages 63. The low pressure difference that exists between passage 63 and atmospheric chamber 81 during the closing cycle of valve 10, shown in FIG. 7A, seats O-ring 62 over openings 70 of passages 63.

Figure 5:
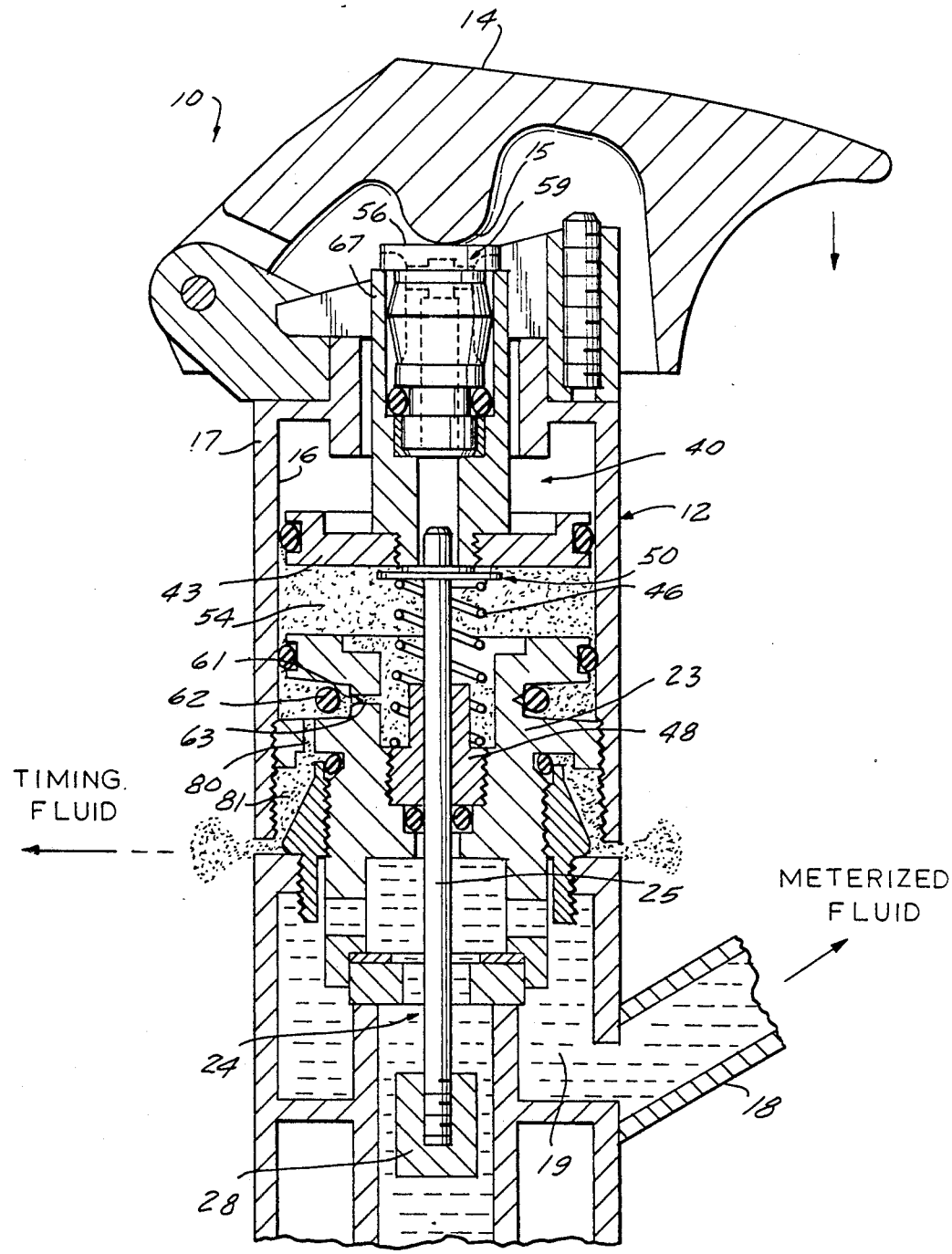
FIGS. 5, 6 and 7A are views, in elevation, of the self-closing faucet of FIG. 1 in the sequence of being shifted to its opened and closed positions.

In FIGS. 4–7, faucet 10 is shown in its various modes of operation. The following is a description of a typical operation cycle. Faucet 10 is opened when handle 14 is pressed in the direction of the arrow shown in FIG. 5. Cam 15 is integrally formed with handle 14 and rolls along on camming surface 56 of air filter assembly 59 of timing assembly 40. Disc 43 compresses the air in metering chamber 54 as it travels downward along inner surface 16 of upper housing 17. The compressed air forces one-way valve means 60, comprised of O-ring 62, to unseat from groove 61, allowing air to flow through openings 70 of passages 63 and past O-ring 62, through passage 80 into atmospheric chamber 81, as shown in FIG. 5. At the same time, valve means 24 opens to allow water to flow through discharge passage 19 when timing assembly 40 shifts axial valve stem 25 and compresses spring 46, see FIGS. 5 and 6.

When handle 14 is released, spring 46 is released and pushes against spring keeper assembly 50, forcing valve stem 25 and timing assembly 40 upward, forming a vacuum in metering chamber 54, see FIG. 7A. A differential pressure forms across disc 43 equal to the difference between the higher atmospheric pressure located in atmospheric chamber 66 and the lower vacuum pressure present in metering chamber 54, and provides a positive seal of one-way valve means 60. The force provided by the differential pressure acts on timing assembly 40 to counterbalance the force of spring 46 in its movement towards its rest position in FIG. 4.

Because of the vacuum pressure present in metering chamber 54 and the movement of timing assembly 40 toward its rest position, air flows through timing assembly 40 into metering chamber 54. Shown in FIG. 7B, air enters timing assembly 40 through ports 68 into chamber 69 and through filter 58 into air chamber 71. Orifice assembly 72 has a small port or orifice 75 sized to control the flow of air through timing assembly 40. After passing through orifice 75, the air enters chamber 77 and flows through filter 74 into chamber 44, past spring keeper assembly 50 and into air metering chamber 54, see FIG. 7A. Filters 58 and 74 keep foreign matter entrained in the air from entering chambers 71 and 77 to prevent possible clogging of timing orifice 75.

As the incoming air enters air chamber 54, its pressure increases, which reduces the differential pressure across timing assembly 40, allowing it to shift towards its rest or closed position. The closing cycle of valve 12 continues until stem end cap 28 and resilient washer 30 touch, closing valve 24, stopping the flow of water and completing the valve cycle, FIG. 4. When valve 12 reaches its closed position, FIG. 4, the pressure in air chamber 54 is equal to the pressure in chamber 66, i.e. atmospheric pressure.

It is obvious that the self-closing valve assembly, as described hereinabove, can be modified to be incorporated in drinking fountains, eye wash fountains, flushing toilets, urinals or the like.

It is claimed:

1. A self-closing faucet comprising:
    an actuating member, a valve body defining a water passageway, an inlet, an outlet and a valve means mounted in said passageway and positioned between said inlet and outlet openings;
    said valve means including an axially mounted reciprocating valve stem, a stationary valve seat positioned between said inlet and outlet openings, and an axially displaceable valve seat mounted on one end of said valve stem;
    a shiftable air metering means, said air metering means including an air chamber and said a piston, said piston being movable within said air chamber and being operably coupled to said valve stem when said actuating member engages and shifts said air metering means;
    one-way valve means, mounted on said valve body, is operably coupled to said air chamber so that air is expelled through said one-way valve means to the atmosphere when said piston is shifted axially, at the same time, said valve stem is shifted away from said fixed valve seat, allowing water flow through said discharge passageway; and
    said air metering means having an orifice to control the rate of flow of air into said air chamber, thereby providing a substantially constant rate of water discharged through said valve outlet opening as said reciprocating valve stem automatically returns to its closed position.

2. The faucet of claim 1 wherein said air metering means includes an air intake passageway communicating with said air chamber, said air intake passageway having an orifice of predetermined diameter, and at least one air filter means mounted in said air intake passage so that particles entrained in said intake air are removed to prevent clogging of said orifice assembly.

3. The faucet of claim 2 wherein a second air filter means is mounted in said air intake passage and positioned between said air chamber and said orifice assembly.

4. The faucet of claim 2 wherein said air filter means is made of a porous plastic material having a pore size smaller than said orifice.

5. The faucet of claim 2 wherein said orifice is in the form of a relatively flat disc having an opening therein and which has a diameter sized to provide a constant flow rate of air into said air chamber over a predetermined period of time.

6. The faucet of claim 5 wherein said constant flow rate is about 0.66 cc. per second.

7. The faucet of claim 5 wherein said air chamber has a volume of about 8.5 cc.

8. The faucet of claim 1 wherein said one-way valve means includes an elastomeric O-ring housed in a circumferential groove in said valve body in juxtaposition with said air chamber, and said groove being interconnected with said air chamber by at least one air passage.

9. The faucet of claim 8 wherein said at least one air passage is two.

10. The faucet of claim 8 wherein said circumferential groove further includes a circumferential recess in the base thereof to provide a valve seat over which said O-ring is seated to provide an air tight seal between said at least one air passage and said groove.

11. The faucet of claim 1, including a timing means to adjustably control the volume of air discharged from said air chamber.

12. The faucet of claim 1 wherein said timing assembly includes an adjusting screw threadedly engaged on said valve body to adjust the axial displacement of said valve stem when said faucet is shifted to its opened position, thereby varying the total volume of water discharge for a complete cycle.

13. A self-closing valve assembly adapted to be coupled to a sanitary fitting having a water discharge passageway positioned between the water inlet and outlet openings thereof, said self-closing valve assembly comprising:
    an actuating member, a valve body having mounted thereto, a valve means including an axially mounted reciprocating valve stem, a stationary valve seat positioned between said inlet and outlet openings, and an axially displaceable valve seat mounted on one end of said valve stem;
    shiftable air metering means, said air metering means including an air chamber and piston, said piston being movable within said air chamber and being operably coupled to said valve stem when said actuating member engages and shifts said air metering means
    one-way valve means, mounted on said valve body, is operably coupled to said air chamber so that air is expelled through said one-way valve means to the atmosphere when said piston is shifted axially from its closed position, at the same time, said valve stem is shifted away from said fixed valve seat, allowing water to flow through said discharge passageway; and
    said air metering means further including an air intake passageway communicating with said air chamber and having an orifice to control the rate of flow of air into said air chamber, thereby providing a substantially constant rate of water discharged through said valve outlet opening as said reciprocating valve stem automatically returns to its closed position.

14. The self-closing valve assembly of claim 13 includes a faucet body having a water inlet opening and a water outlet passage.

15. The self-closing valve assembly of claim 13 wherein said air metering means includes an air intake passageway communicating with said air chamber, said air intake passageway having an orifice of predetermined diameter, and at least one air filter means mounted in said air intake passage so that particles entrained in said intake air are removed to prevent clogging of said orifice assembly.

16. The self-closing valve assembly of claim 15 wherein a second air filter means is mounted in said air intake passage and positioned between said air chamber and said orifice assembly.

17. The self-closing valve assembly of claim 15 wherein said air filter means is made of a porous plastic material having a pore size smaller than said orifice.

18. The self-closing valve assembly of claim 15 wherein said orifice is in the form of a relatively flat disc having an opening therein and which has a diameter sized to provide a constant flow rate of air into said air chamber over a predetermined period of time.

19. The self-closing valve assembly of claim 15 wherein said constant air flow rate is about 0.66 per second.

20. The self-closing valve assembly of claim 15 wherein said air chamber has a volume of about 8.5 cc.

21. The self-closing valve assembly of claim 13 wherein said one-way valve means includes an elastomeric O-ring housed in a circumferential groove in said valve body in juxtaposition with said air chamber, and said groove being interconnected with said air chamber by at least one air passage.

22. The self-closing valve assembly of claim 21 wherein said at least one air passage is two.

23. The self-closing valve assembly of claim 21 wherein said circumferential groove further includes a circumferential recess in the base thereof to provide a valve seat over which said O-ring is seated to provide an air tight seal between said at least one air passage and said groove.

24. The self-closing valve assembly of claim 13, including a timing means to adjustably control the volume of air discharged from said air chamber.

25. The self-closing valve assembly of claim 13 wherein said timing assembly includes an adjusting screw threadedly engaged on said valve body to adjust the axial displacement of said valve stem when said faucet is shifted to its opened position, thereby varying the total volume of water discharge for a complete cycle.

26. A shiftable air metering means in combination with a self-closing valve of the type having an actuator member a water inlet and water outlet with valve means interposed therebetween, said air metering means being operably coupled to said valve means through said actuating member;

said air metering means, including an air chamber and a piston, said piston being movable within said air chamber and being operably coupled to said valve means when said actuating member engages and shifts said air metering means;

one-way air valve means, mounted to said self-closing valve body, is coupled to said air chamber by an air conducting conduit;

said one-way air valve means includes an elastomeric member releasably sealing said air conducting conduit so that when said piston is shifted from its normally closed position, said elastomeric member opens said air conducting conduit to expel air from said air chamber to the atmosphere, at the same time, said valve means is opened to allow water to flow through said water outlet; and an air intake passageway communicating with said air chamber and having an orifice to control the rate of air flow into said air chamber as said piston returns automatically to its normally closed position.

27. The air metering means of claim 26 includes a faucet body having a water inlet opening and a water outlet passage.

28. The air metering means of claim 27 wherein said timing assembly includes an adjusting screw threadedly engaged on said valve body to adjust the axial displacement of said valve stem when said faucet is shifted to its opened position, thereby varying the total volume of water discharge for a complete cycle.

29. The air metering means of claim 26 includes an air intake passageway communicating with said air chamber, said air intake passageway having an orifice of predetermined diameter, and at least one air filter means mounted in said air intake passage so that particles entrained in said intake air are removed to prevent clogging of said orifice assembly.

30. The air metering means of claim 29 wherein a second air filter means is mounted in said air intake passage and positioned between said air chamber and said orifice assembly.

31. The air metering means of claim 29 wherein said air filter means is made of a porous plastic material having a pore size smaller than said orifice.

32. The air metering means of claim 29 wherein said orifice is in the form of a relatively flat disc having an opening therein and which has a diameter sized to provide a constant flow rate of air into said air chamber over a predetermined period of time.

33. The air metering means of claim 29 wherein said constant air flow rate is about 0.66 per second.

34. The air metering means of claim 29 wherein said air chamber has a volume of about 8.5 cc.

35. The air metering means of claim 26 wherein said one-way valve means includes an elastomeric O-ring housed in a circumferential groove in said valve body in juxtaposition with said air chamber, and said groove being interconnected with said air chamber by at least one air passage.

36. The air metering means of claim 35 wherein said at least one air passage is two.

37. The air metering means of claim 35 wherein said circumferential groove further includes a circumferential recess in the base thereof to provide a valve seat over which said O-ring is seated to provide an air tight seal between said at least one air passage and said groove.

38. The air metering means of claim 26, including a timing means to adjustably control the volume of air discharged from said air chamber.

* * * * *